US008638639B2

(12) United States Patent  (10) Patent No.: US 8,638,639 B2
Bratton et al.  (45) Date of Patent: Jan. 28, 2014

(54) METHOD OF USING DIPOLE COMPRESSIONAL DATA TO DETERMINE PROPERTIES OF A SUBTERRANEAN STRUCTURE

(75) Inventors: Tom R. Bratton, Littleton, CO (US); Bikash K. Sinha, Cambridge, MA (US); Samer Alatrach, Englewood, CO (US)

(73) Assignee: Schlumberger Technology Corporation, Sugar Land, TX (US)

( * ) Notice: Subject to any disclaimer, the term of this patent is extended or adjusted under 35 U.S.C. 154(b) by 638 days.

(21) Appl. No.: 12/789,242

(22) Filed: May 27, 2010

(65) Prior Publication Data
US 2011/0134720 A1  Jun. 9, 2011

Related U.S. Application Data

(60) Provisional application No. 61/230,022, filed on Jul. 30, 2009.

(51) Int. Cl.
*G01V 1/28* (2006.01)
*G01V 1/40* (2006.01)

(52) U.S. Cl.
USPC .......................................................... 367/35

(58) Field of Classification Search
USPC .......................................................... 367/35
See application file for complete search history.

(56) References Cited

U.S. PATENT DOCUMENTS

| | | | |
|---|---|---|---|
| 5,278,805 A * | 1/1994 | Kimball | ............................ 367/32 |
| 5,398,215 A | 3/1995 | Sinha | |
| 5,838,633 A | 11/1998 | Sinha | |
| 6,510,389 B1 | 1/2003 | Winkler | |
| 6,611,761 B2 | 8/2003 | Sinha | |
| 6,614,716 B2 | 9/2003 | Plona | |
| 6,714,480 B2 | 3/2004 | Sinha | |
| 6,904,365 B2 | 6/2005 | Bratton | |
| 7,042,802 B2 | 5/2006 | Sinha | |
| 7,120,541 B2 | 10/2006 | Wang | |
| 2002/0183930 A1 * | 12/2002 | Plona et al. | ......................... 702/6 |
| 2004/0158997 A1 * | 8/2004 | Tang | ........................... 166/254.2 |
| 2005/0190651 A1 * | 9/2005 | Plona et al. | ..................... 367/68 |
| 2008/0319675 A1 * | 12/2008 | Sayers | ............................ 702/11 |
| 2009/0109794 A1 | 4/2009 | Sinha | |
| 2009/0210160 A1 | 8/2009 | Suarez-Rivera | |
| 2010/0020639 A1 * | 1/2010 | Sinha | ............................... 367/31 |
| 2011/0134720 A1 * | 6/2011 | Bratton et al. | .................. 367/35 |

FOREIGN PATENT DOCUMENTS

GB  2472300 A  * 12/2011
WO  2004/067912 A1  8/2004

OTHER PUBLICATIONS

"Mechanical Sidewall Coring Tool" Sheet, Schlumberger, Document No. FE_04_029_0, Aug. 2004.
Sinha, B.K. et al. "Dispersion and radial depth of investigation of borehole modes", Geophysical Prospecting, 2004, 52, 271-286.

* cited by examiner

*Primary Examiner* — Daniel Pihulic (57) ABSTRACT

To determine properties of a subterranean structure, information relating to dipole compressional data is collected based on measurements by a logging tool in a borehole. The information relating to the dipole compressional data is analyzed in multiple dimensions (e.g., multiple borehole axial planes) to determine the properties of the subterranean structure through which the borehole extends.

18 Claims, 8 Drawing Sheets

FIG. 1

FIG. 2
Slowness Dispersion Plot
(Depth = 1471.92 ft)

METHOD OF USING DIPOLE COMPRESSIONAL DATA TO DETERMINE PROPERTIES OF A SUBTERRANEAN STRUCTURE

CROSS REFERENCE TO RELATED APPLICATIONS

This application claims the benefit under 35 U.S.C. §119(e) of U.S. Provisional Application Ser. No. 61/230,022 entitled "Method of Using Dipole Compressional to Diagnose and Evaluate Formation Properties and Geomechanical Behavior," filed Jul. 30, 2009, which is hereby incorporated by reference.

BACKGROUND

Mechanical disturbances can be used to establish acoustic waves in earth formations surrounding a borehole, and the properties of these waves can be measured to obtain information about the formations through which the waves have propagated. Parameters of compressional, shear and Stoneley waves, such as their velocity (or its reciprocal, slowness) in the formation and in the borehole, can be indicators of formation characteristics that help in evaluation of the location and/or producibility of hydrocarbon or other resources.

Typically, a logging tool is run into the borehole, where the logging tool includes one or more sonic (acoustic) sources (transmitters) and multiple spaced apart receivers. Measurements are made by the receivers as the logging tool is moved slowly in the borehole. The sonic signals from the one or more transmitters enter the formation adjacent the borehole, and the arrival times and possibly other characteristics of receiver responses are used to find formation parameters.

Conventionally, shear wave signals (S-waves) detected by the receivers are analyzed. The shear wave data processed can include dipole shear data (two-dimensional in shear) or dipole shear data plus Stoneley data (three-dimensional in shear).

However, performing conventional multi-dimensional analyses of shear data to determine formation properties may not provide accurate results.

SUMMARY

In general, according to an embodiment, a method of determining properties of a subterranean structure includes receiving information relating to dipole compressional data collected based on measurements by a logging tool in a borehole. The information relating to the dipole compressional data is analyzed in multiple dimensions to determine the properties of the subterranean structure through which the borehole extends.

Other or alternative features will become apparent from the following description, from the drawings, and from the claims.

BRIEF DESCRIPTION OF THE DRAWINGS

Some embodiments of the invention are described with respect to the following figures.

DETAILED DESCRIPTION

To determine properties of a subterranean structure through which a borehole extends, dipole compressional data collected based on measurements by a logging tool run in the borehole is analyzed in multiple dimensions (e.g., multiple borehole axial planes). Understanding of the properties of the subterranean structure allows an operator to ascertain whether the subterranean structure contains a fluid of interest (e.g., hydrocarbons, fresh water, etc.) or whether the subterranean structure has other desirable or target characteristics.

Traditionally, shear data is analyzed in multiple dimensions for understanding properties of a subterranean structure. However, no effort has been directed at efficiently quantifying subterranean structure properties based on analyzing dipole compressional information in multiple dimensions (multiple borehole axial planes). Conventional interpretation of compressional data typically involves one-dimensional interpretation.

Techniques according to some embodiments capitalize on the observation that dipole compressional velocities (or their inverse, slownesses) behave in an isotropic manner much the same way as dipole shear velocities (or their inverse, slownesses). Slowness represents the inverse of velocity. However, under certain conditions, performing analysis to understand subterranean structure properties based on multi-dimension shear data interpretation and one-dimensional compressional data interpretation may be insufficient or may not produce accurate results. For example, in slow formations, it is possible that a shear wave signal cannot be detected via receivers. A "slow" formation refers to a formation having a sonic shear velocity that is slower than the velocity of the drilling mud (or other fluid) in the borehole.

Figure 1:
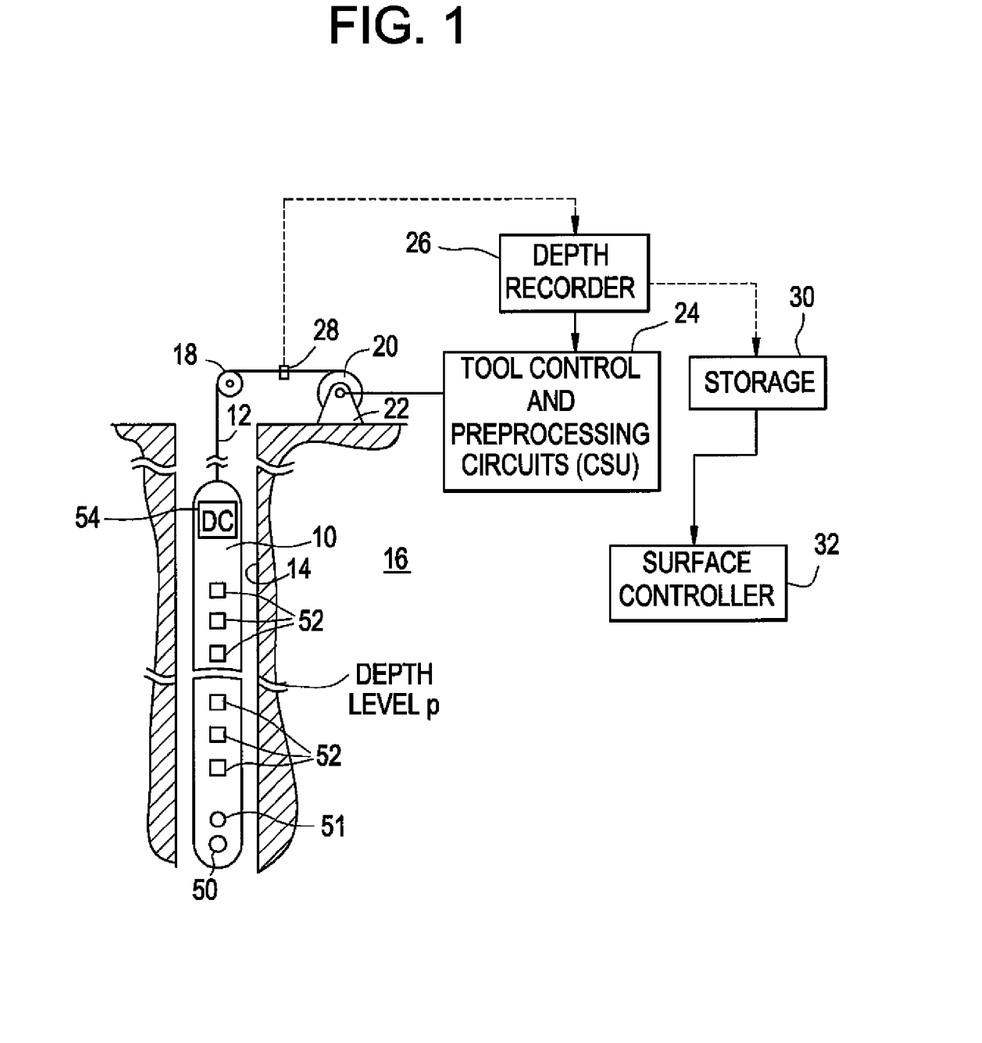
FIG. 1 illustrates an example logging arrangement that includes a logging tool, for determining subterranean structure properties based on dipole compressional data, in accordance with some embodiments.

Referring to FIG. 1, an overall schematic illustration of a well logging system that incorporates some embodiments is depicted. A logging tool 10 is lowered on a multi-conductor cable 12 (which can be armored, for example) into a borehole 14 (cased or un-cased) to take sonic (acoustic) logs of a subsurface formation (more generally referred to as a "subterranean structure") 16. The logging tool 10 is provided with at least one sonic dipole source or transmitter 50, and a plurality of sonic receivers 52.

The dipole source 50 generates flexural waves (associated with dispersive borehole flexural modes). In some embodiments, the logging tool 10 can also include a monopole transmitter 51 that transmits a Stoneley wave as well as a compressional headwave in all directions. The receivers 52 can include both monopole and dipole receivers.

In some embodiments, the logging tool 10 can also include a downhole controller 54 that is able to receive measurements from the receivers 52. The downhole controller 54 can be implemented with a computer or a processor. The downhole controller 54 is able to determine shear and compressional wave data (e.g., shear and compression slownesses) based on the measurement data from the receivers 52. In alternative embodiments, instead of performing the processing downhole by the downhole controller 54 in the logging tool 10, the processing can be performed by a surface controller 32, which can be implemented with a computer (server computer, desktop computer, notebook computer, multiprocessing computer, personal digital assistant, etc.).

The receivers 52 are spaced along the length of tool 10 from each other and from the transmitter(s), and typically the distance between each transmitter and the receiver closest thereto is much greater than the inter-receiver distance.

The logging tool 10 is configured for movement up and down the borehole 14 on the cable 12, and as the tool 10 is moved, the transmitters 50, 51, intermittently or continuously generate sonic (acoustic) signals. The generated sonic signals travel through the borehole 14 and/or through the formation 16, and the receivers 52 detect energy which results from the generated signals.

The mechanism for moving the tool 10 in the borehole includes the cable 12 which extends to the sheave wheel 18 at the surface of the formation, and then to a suitable drum and winch mechanism 20 which raises and lowers the tool 10 in the borehole as desired. Electrical connection between the transmitter and receivers on the one hand, and the surface equipment on the other hand, is made through suitable multi-element slipping and brush contact assembly 22 associated with the drum and winch mechanism 20. A unit 24 contains tool control and preprocessing circuits which send electrical signals to tool 10 and receive other electrical signals (sonic logs) over cable 12 and assembly 22. Unit 24 cooperates with a depth recorder 26 that derives depth level signals from depth measuring wheel 28 so as to associate the signals from receivers 54 with respective depth levels z in borehole 14. The outputs of sonic receivers 54, after optional pre-processing in unit 24, are sent to storage 30 (implemented with storage media such as disk-based storage media or semiconductor storage media), which can also receive signals from or through depth recorder 26 so as to associate sonic receiver outputs with respective depth levels z in borehole 14.

Storage 30 can store the outputs of receivers 52 in analog or digital form, a set for each respective depth level z. The processing of the log measurements is then accomplished by the surface controller 32 which processes the information according to the techniques set forth below. The output of the processing can include one or more dispersion curves.

In alternative implementations, as noted above, instead of performing processing at the surface controller 32, the processing can be performed by the downhole controller 54 in the logging tool 10. In such alternative implementations, the storage 30 is used to store the output of the downhole controller 54 (along with depth information recorded by the depth recorder 26).

Figure 2:
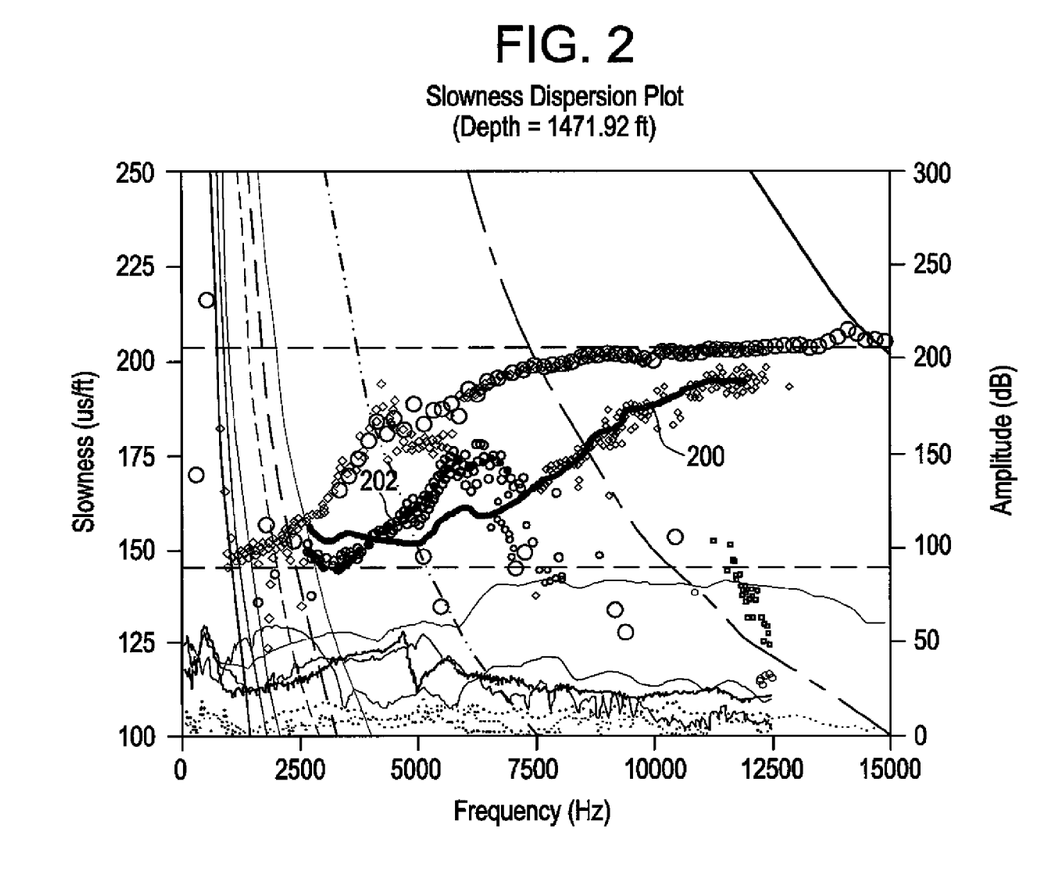
FIG. 2 is a slowness dispersion plot of responses in two corresponding different dipole compressional modes, in accordance with an embodiment.

The response of a receiver 52 in the logging tool 10 to a sonic signal from a transmitter is a waveform of a general type as depicted in FIG. 2. As seen in FIG. 2, the responses of a receiver in different dipole compressional modes are depicted. FIG. 2 illustrates on the vertical axes slowness data and amplitude data as a function of frequency (horizontal axis). The plot shown in FIG. 2 is an example of a slowness dispersion plot. Curves 200 and 202 in FIG. 2 illustrate responses in the two corresponding different dipole compressional modes. Each curve 200, 202 shown in FIG. 2 is illustrative of a dispersive wave that is responsive to the dipole transmitter 50.

The two dipole compressional modes refer to dipole firings along the maximum and minimum horizontal stress directions, respectively. A dipole firing along a particular horizontal stress direction refers to activation of a dipole transmitter that is parallel to the particular horizontal stress direction.

Figure 3:
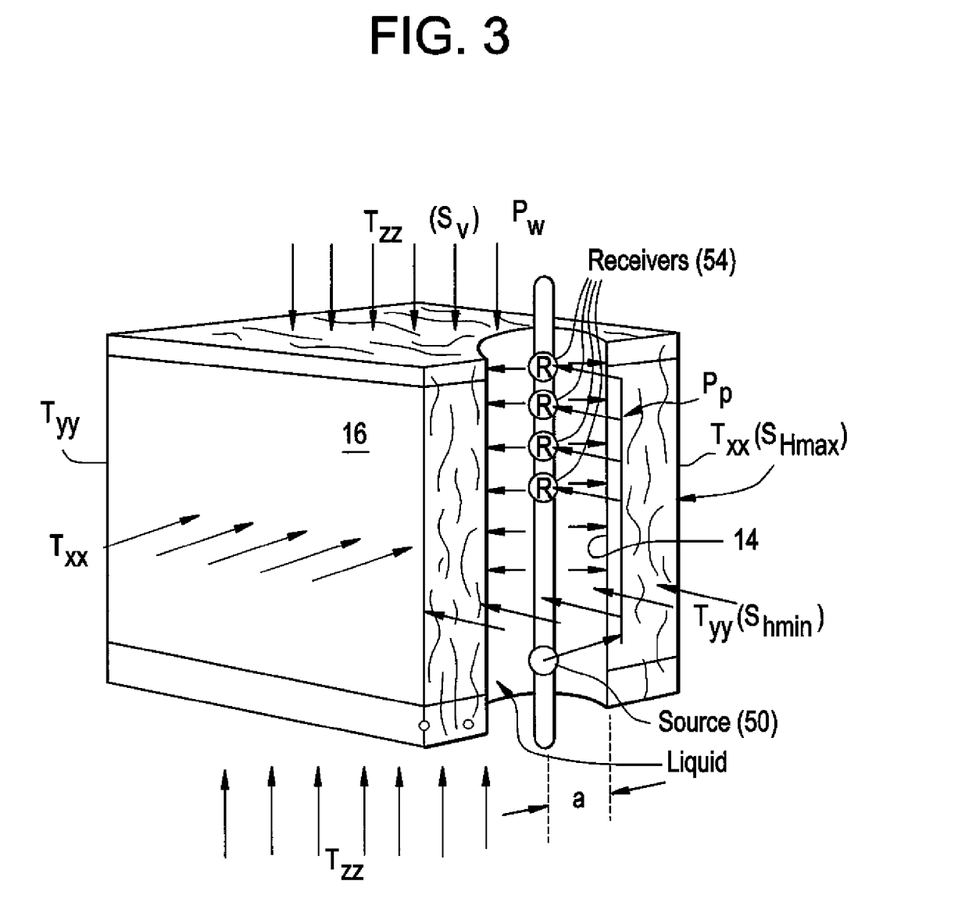
FIG. 3 illustrates stresses in various directions within a structure that includes a formation and a borehole through the formation.
Figure 4:
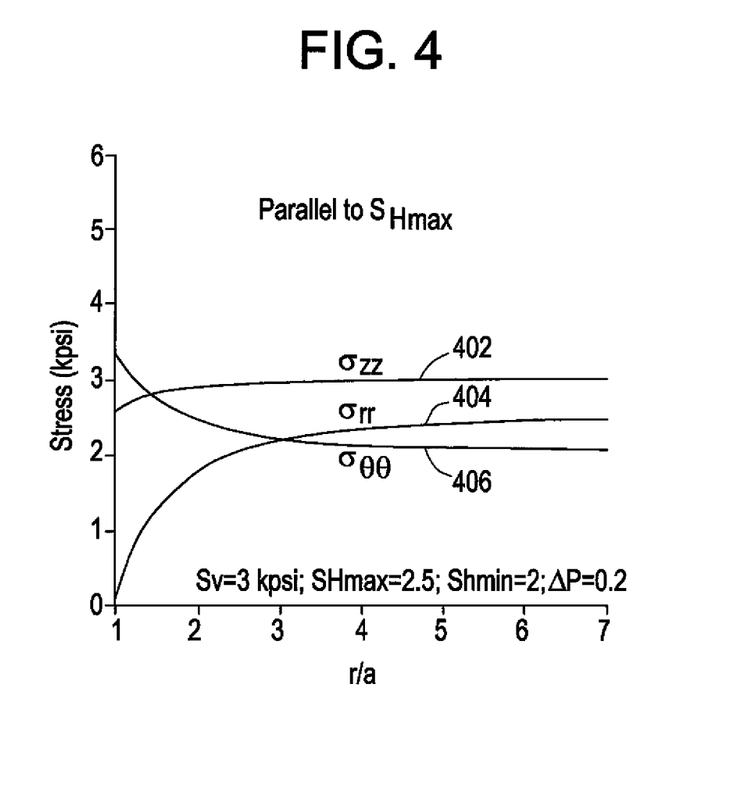
FIGS. 4 and 5 are graphs illustrating stress distributions as functions of distances from the borehole along the maximum and minimum horizontal stress directions, respectively.
Figure 5:
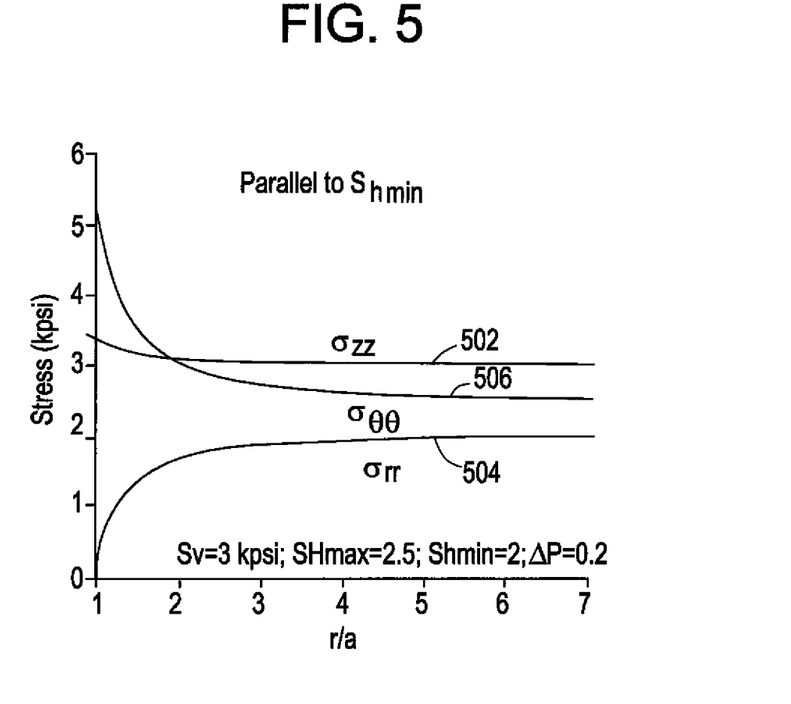

The maximum and minimum horizontal stress directions are illustrated in FIG. 3. FIG. 3 is a schematic diagram of a fluid-filled borehole 14 in a porous formation 16 subject to the three principal stresses. $P_p$ and $P_w$ denote the pore pressure and wellbore pressure, respectively. The presence of a wellbore of radius a, causes near-wellbore stress distributions that can be obtained based on the theory of elasticity and are shown in FIGS. 4 and 5. A pressure difference, $\Delta P$, is calculated as $\Delta P = P_w - P_p$.

In FIG. 3, $T_{XX}$ (or $S_{Hmax}$) represents the maximum horizontal stress direction, while $T_{YY}$ ($S_{hmin}$) represents the minimum horizontal stress direction. $T_{ZZ}$ ($S_V$) represents the vertical stress direction. The maximum horizontal stress and minimum horizontal stress directions lie in two borehole axial planes, where each borehole axial plane is generally perpendicular to each other and to the longitudinal axis of the borehole.

FIG. 4 shows several stress distributions from the near-field to the far-field along the maximum horizontal stress direction (parallel to $S_{Hmax}$). Three curves 402, 404, and 406 are shown in FIG. 4. Curve 402 represents the principal stress ($\sigma_{zz}$ as a function of r/a, where r represents the distance from the borehole 14 in FIG. 3, and a represents the radius of borehole 14 in FIG. 3). A larger r/a value indicates a further distance from the borehole 14, and represents the far field. A r/a value represents a closer distance to the borehole 14, with r/a=1 representing the interface of the borehole 14 and formation 16. The principal stress $\sigma_{zz}$ is axial at the wellbore and vertical at the far-field. In between the wellbore and the far-field, the principal stress $\sigma_{zz}$ has a different orientation between axial and vertical.

Curve 404 represents another principal stress $\sigma_{rr}$ as a function of r/a. Curve 406 represents principal stress $\sigma_{\theta\theta}$ as a function of r/a. Principal stresses $\sigma_{rr}$ and $\sigma_{\theta\theta}$ also change orientations between the wellbore and the far field. As noted above, the stresses represented by curves 402, 404, and 406 are at an azimuth parallel to the maximum horizontal stress direction ($S_{Hmax}$) at a given depth. Curves 402, 404, 406 illustrate how the three different stresses vary in magnitude as they approach the borehole 14.

FIG. 5, on the other hand, depicts curves 502, 506, and 504, which represent the stress $\sigma_{zz}$, stress $\sigma_{rr}$ and stress $\sigma_{\theta\theta}$, respectively, as a function r/a, along the minimum horizontal stress direction ($S_{hmin}$).

Generally, the stresses $\sigma_{zz}$ and $\sigma_{\theta\theta}$ exhibit larger magnitudes in the near-wellbore region along the minimum horizontal stress direction (see FIG. 5) than those along the maximum horizontal stress direction (see FIG. 4). The differences between such stresses in the minimum horizontal stress direction and the maximum horizontal stress direction cause dipole dispersion crossovers in the presence of such stress distributions. The dipole dispersion crossover is an indicator of stress-induced anisotropy dominating any intrinsic anisotropy that may be present. The foregoing is consistent with the observation that dipole compressional slownesses behave in an anisotropic manner much the same way as dipole shear slownesses. Therefore, the measurement of dipole compressional slownesses can be used in diagnosing and evaluating formation properties and geomechanical behavior.

In addition to stress-induced anisotropy, other causes of formation anisotropy also exist. Other sources of anisotropy include bedding induced anisotropy and fracture induced anisotropy. These other sources of anisotropy provide intrinsic anisotropy. Some embodiments of the invention are applicable to formations exhibiting intrinsic anisotropy.

In accordance with some embodiments, the dipole compressional data is processed for the two orthogonal dipole transmitter orientation for compressional slownesses. The differences in the dipole compressional modes are used for dipole firings along the maximum and minimum horizontal stress directions, respectively. In accordance with some embodiments, both monopole and dipole compressional modes are excited and recorded in slow formations. Dipole compressional waves can also be excited in some faster formations. While their amplitude is relatively small, the dipole compressional waves are often much larger than the background noise and thus they can be quantified. Note that the monopole compressional mode is generated at lower frequencies than in the case with dipole compressional modes. Monopole compressional modes respond to azimuthal averages of formation properties. In contrast, dipole compressional modes are capable of discriminating formation properties in two adjacent quadrants, as depicted in FIG. 6.

Figure 6:
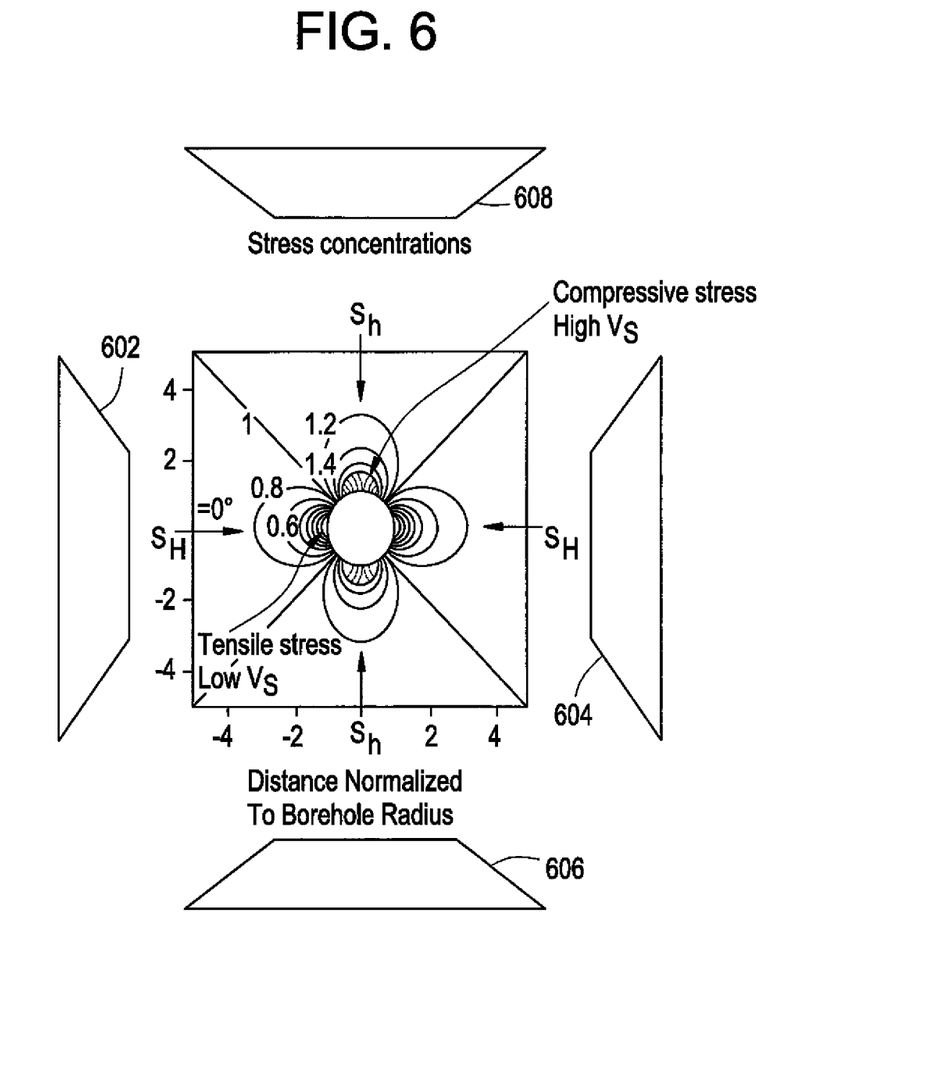
FIG. 6 is a schematic diagram of stress contours in the near-wellbore region resulting from far-field stresses.

FIG. 6 is a stress contour polar plot of the sum of two principal stresses in a cross-sectional plane. FIG. 6 shows stress contours resulting from far-field formation stresses in the presence of a fluid-filled borehole. The maximum and minimum horizontal stress directions are also displayed in the stress contour plots. A dipole transmitter that is parallel to the maximum horizontal stress direction insonifies two opposite quadrants indicated by 602 and 604, whereas a dipole transmitter parallel to the minimum horizontal stress direction largely probes two opposite quadrants depicted by 606 and 608. FIG. 6 shows that the acoustic properties of the formation 16 are sensitive to stress.

Compressional and dipole compressional modes are radiating or leaky modes because their slownesses are smaller than the formation shear slownesses. As a result, recorded waveforms containing these leaky compressional modes exhibit amplitude attenuation along a receiver array (such as the array of receivers 54 depicted in FIG. 1).

The dipole compressional mode is largely affected by stress-induced changes in the compressional modulus $C_{33}$ for propagation along the X3-direction. Based on an acoustoelastic model, changes in the effective compressional modulus $C_{33}$ can be related to corresponding changes in the effective stresses $\sigma_{33}$, $\sigma_{11}$, and $\sigma_{22}$ in the propagating medium as shown in Eq. 1. Note that $\sigma_{33}$, $\sigma_{11}$, and $\sigma_{22}$, respectively, denote $\sigma_v$, $\sigma_{Hmax}$, and $\sigma_{hmin}$ in the propagating medium.

$$\Delta C_{33} = [(1-2\nu)C_{111}] \frac{(\Delta\sigma_{11} + \Delta\sigma_{22} + \Delta\sigma_{33})}{2\mu(1+\nu)} + [-(1+2\nu)(\lambda+2\mu) - 4(1-\nu)C_{155}] \frac{(\Delta\sigma_{11} + \Delta\sigma_{22})}{2\mu(1+\nu)} + [2\mu(1+\nu) + (3+2\nu)(\lambda+2\mu) + 8\nu C_{155}] \frac{\Delta\sigma_{33}}{2\mu(1+\nu)},$$  Eq. 1 where $\lambda$ and $\mu$ are the Lame constants, and $\nu$ is the Poisson's ratio in the chosen isotropic reference state, and where $C_{111}$ and $C_{155}$ are the formation nonlinear constants referred to the chosen reference state. Notice that radial variations in the three principal stresses cause corresponding changes in the compressional modulus. Such changes in the compressional modulus would, in turn, change dipole compressional velocities as a function of frequency resulting in the differences in the dipole compressional mode dispersions in the two orthogonal directions.

Briefly, according to the theory of elasticity, the elastic response of a body to an applied load may be obtained using the principle of energy conservation, where the applied stress causes deformations, which changes the strain energy within the body. Mathematically, the stress ($\tau$) at each point of a body is expressed as the change in strain energy associated to the change in the displacement gradient. This in turn, is proportional to the resulting strain. The resulting expressions (E1 and E2, below) correspond to the generalized Hooke's law (in tensorial notation), and indicate a proportional relationship between stress ($\tau_{ij}$) and strain ($\epsilon_{ij}$).

$$\tau_{ij} = C_{ijkl}\varepsilon_{kl} \quad (E1)$$

$$C_{ijkl} = \begin{bmatrix} C_{11} & C_{12} & C_{13} & C_{14} & C_{15} & \cdots \\ C_{21} & C_{22} & C_{23} & C_{24} & C_{25} & \cdots \\ C_{31} & C_{32} & C_{33} & C_{34} & C_{35} & \cdots \\ C_{41} & C_{42} & C_{43} & C_{44} & C_{45} & \cdots \\ C_{51} & C_{52} & C_{53} & C_{54} & C_{55} & \cdots \\ \cdots & \cdots & \cdots & \cdots & \cdots & \cdots \end{bmatrix} \quad (E2)$$

The coefficient of proportionality in (E1) and (E2) is the elastic-tensor or stiffness-tensor. For heterogeneous bodies, $C_{ijkl}$ is a function of the position in the body; for homogeneous bodies, $C_{ijkl}$ is a constant and independent of position. Mathematically $C_{ijkl}$ is a fourth-order tensor that has $3^4=81$ independent components. However, symmetry properties and conditions of positive definiteness reduce the number of independent components to 21. The number of independent components of the tensor may be reduced further, depending on material symmetries. For orthotropic symmetry, the material response is characterized by nine independent stiffness coefficients, namely, $C_{11}$, $C_{22}$, $C_{33}$, $C_{44}$, $C_{55}$, $C_{66}$, $C_{12}$, $C_{13}$, $C_{23}$.

For transverse isotropic behavior (i.e., rotational symmetry) the material response is characterized by five independent material constants, namely, $C_{11}=C_{22}$, $C_{33}$, $C_{44}=C_{66}$, $C_{12}$, $C_{13}=C_{23}$; where $C_{66}$ is a function of the others. For isotropic symmetry, there is no directional bias. Accordingly, the material response for isotropic symmetry may be characterized with only two independent material constants ($C_{11}=C_{22}=C_{33}$, $C_{12}=C_{13}=C_{23}$, where $C_{44}=C_{55}=C_{66}$ are functions of the others).

Based on the aforementioned symmetries, the stiffness matrix for anisotropic materials with orthotropic symmetry may be expressed as follows:

$$C_{ijkl} = \begin{bmatrix} C_{11} & C_{12} & C_{13} & 0 & 0 & 0 \\ C_{21} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & \cdots & C_{66} \end{bmatrix}. \quad (E3)$$

For a given set of formation material parameters, it is clear from Eq. 1 and typical near-wellbore stress distributions shown in FIGS. 4 and 5, that dipole compressional slownesses will be smaller at higher frequencies for dipole oriented along the minimum horizontal stress direction than the case when the transmitter is oriented along the maximum horizontal stress direction. Therefore, dipole compressional slownesses at higher frequencies can be used to determine the azimuth of the maximum or minimum horizontal stress directions. If radial depths of investigation at low frequencies are essentially the same for the monopole compressional and the two orthogonal dipole compressional modes, low frequency asymptotes of these leaky compressional modes coincide with the far-field compressional slowness of the formation in the presence of triaxial stresses.

Analyses of dipole compressional mode also provide a way to estimate one of the three nonlinear elastic constants $C_{111}$ that is essential for estimating all nine stress coefficients ($C_{11}$, $C_{22}$, $C_{33}$, $C_{44}$, $C_{55}$, $C_{66}$, $C_{12}$, $C_{13}$, $C_{23}$) of plane wave velocities. Recall that changes in the Stoneley and cross-dipole dispersions and associated changes in shear moduli enable estimation of the other two nonlinear constants $C_{144}$ and $C_{155}$.

The dipole compressional arrivals in this example are dominated by $C_{11}$ and $C_{22}$. Thus, when quantified and combined with the compressional measurement of $C_{33}$ and shear measurements of $C_{44}$, $C_{55}$ and $C_{66}$, techniques according to some embodiments now measure 6 of the 9 orthorhombic unknowns. In fact, with this technique there are fewer unknowns percentage wise in an orthotropic formation (3 out of 9) than a TI (transverse isotropic) formation (2 out of 5) with current technology.

Another aspect of some embodiments of the invention is the observation that horizontal velocities can be measured on cores taken by a Mechanical Sidewall Coring Tool (MSCT) (developed by Schlumberger) or other core sampling tool from vertical wells with non-dipping beds. The MSCT is designed to retrieve multiple, high quality sidewall cores in hard formations. Recovery depends more on grain cementation than on formation porosity, and is possible for porosities as high as 30 P.U. provided the grains are well cemented.

The results from the dipole compressional evaluation of $C_{11}$ and $C_{22}$ can be checked and verified using horizontal side core taken by the MSCT or horizontal plugs in conventional cores.

Figure 7:
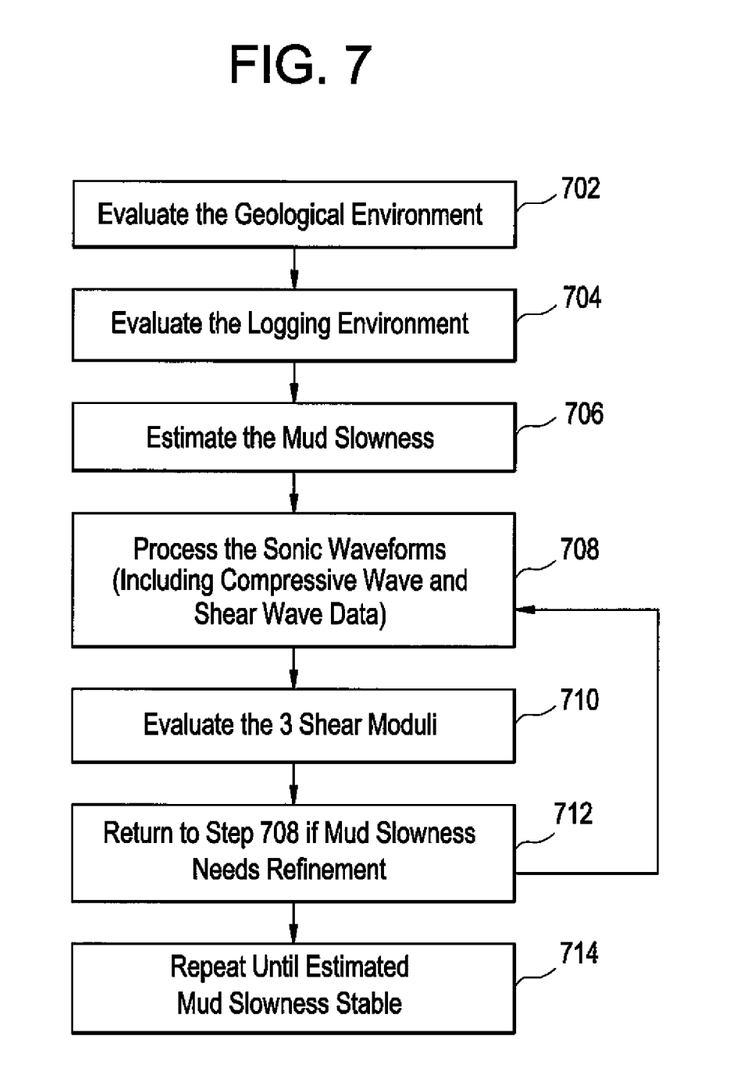
FIG. 7 is a flow diagram of a workflow according to some embodiments.

FIG. 7 is a flow diagram of a workflow according to an embodiment. The geological environment is evaluated (at 702). Evaluating the geological environment includes one or more of the following: evaluating the structural geology of the formation 16; evaluating the petrophysicals of the formation 16; evaluating the geology of the borehole 14; and evaluating the geomechanics of the formation 16.

In addition, the logging environment is evaluated (at 704). Evaluating the logging environment includes one or more of the following: evaluating the directional survey; evaluating the hardware and software configuration; evaluating the mud system; evaluating the mud logs; evaluating the mud resistivity log; evaluating the borehole temperature log; evaluating the Stoneley log; evaluating the FMI (formation micro imager) log; evaluating the CDF (Calibrated Downhole Force) log; evaluating the differential pressure log; evaluating caliper data; evaluating the bulk density data; and evaluating the drilling reports.

The mud slowness is also estimated (at 706). Mud slowness (slowness of the fluid in the borehole 14) is determined based on mud density, dispersion analysis, and Stoneley and flexural inversion. The mud density is then correlated with the mud slowness, and the variability in the mud slowness is estimated based on temperature, pressure, and salinity. All the data is then integrated into a mud slowness log.

Next, the sonic waveforms collected by the logging tool 10 are processed (at 708), where the sonic waveforms include dipole (and possibly monopole) compressional wave and shear wave data. Thus, processing the sonic waveforms include processing compressional slowness, dipole compressional slownesses in the maximum and minimum stress directions, processing dipole shear slownesses, processing Stoneley slowness, and processing the 3D (three-dimensional) anisotropy module.

The three shear moduli are then evaluated (at 710). Following evaluation of the three shear moduli, the mud slowness is then re-evaluated, and the process returns to step 708 if the mud slowness requires refinement.

The tasks 708-712 of the workflow of FIG. 7 are then repeated (at 714) until the estimate of the mud slowness is stable.

Figure 8:
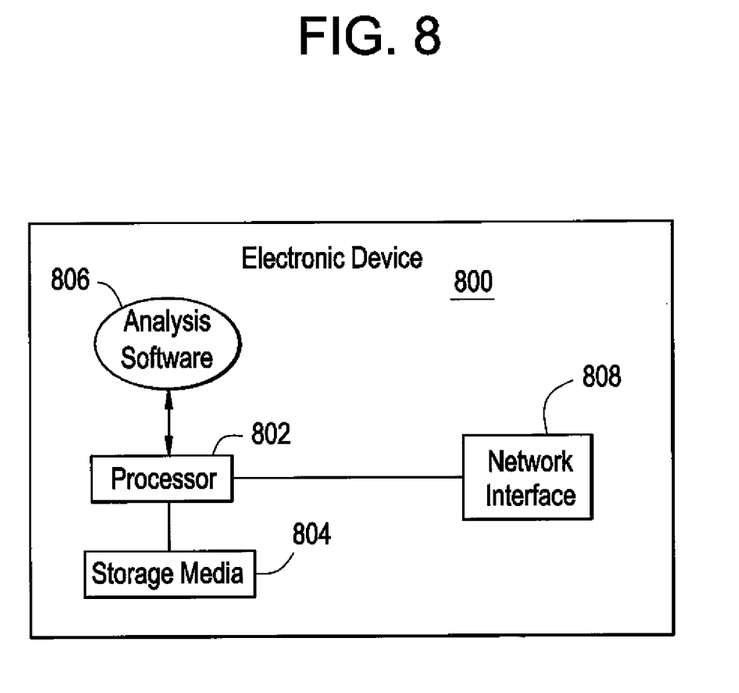
FIG. 8 is a block diagram of an electronic device incorporating an embodiment of the invention.

Various tasks according to some embodiments can be performed by an electronic device such as the downhole controller 54 or the surface controller 32 shown in FIG. 1. An example electronic device 800 is shown in FIG. 8. The electronic device 800 includes a processor 802 that is connected to storage media 804. The electronic device 800 also includes analysis software 806 that is executable on the processor 802. In addition, a network interface 808 connects the electronic device 800 to a communications medium to receive information from the logging tool 10 shown in FIG. 1.

Although analysis software 806 is shown in the electronic device 800, it is noted that in alternative implementations, the various processing tasks according to some embodiments can be performed entirely in hardware, or by a combination of hardware and firmware.

Instructions of software 806 are loaded for execution on the processor 802. The processor can include one or more microprocessors, one or more microcontrollers, one or more processor modules or subsystems (including one or more microprocessors or microcontrollers), or other control or computing devices or integrated circuit devices. As used here, a "processor" refers to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of determining properties of a subterranean structure, comprising:
   receiving, by a computer, information relating to dipole compressional data collected based on measurements by a logging tool in a borehole; and
   analyzing, by the computer, the information relating to the dipole compressional data in multiple dimensions to determine the properties of the subterranean structure through which the borehole extends;
   wherein the multiple dimensions include multiple borehole axial planes, and wherein analyzing the information comprises analyzing the information relating to dipole compressional data in two orthogonal axial planes containing a maximum horizontal stress direction and a minimum horizontal stress direction, respectively.

2. The method of claim 1, wherein analyzing the information relating to dipole compressional data comprises analyzing the information relating to dipole compressional slownesses.

3. The method of claim 1, wherein receiving the information relating to the dipole compressional data comprises receiving the information relating to the dipole compressional data derived from measurements collected by receivers of the logging tool in response to sonic signals produced by activation of at least one dipole transmitter in the logging tool.

4. The method of claim 3, wherein activation of the at least one dipole transmitter comprises activation of the at least one dipole transmitter that is parallel to the maximum horizontal stress direction and activation of the at least one dipole transmitter that is parallel to the minimum horizontal stress direction.

5. The method of claim 1, further comprising:
   receiving shear data collected based on measurements by the logging tool; and
   analyzing the shear data along with the information relating to the dipole compressional data to determine the properties of the subterranean structure.

6. The method of claim 1, further comprising:
   receiving further information collected based on excitation of the logging tool in a monopole compressional mode; and
   analyzing the further information along with the information relating to the dipole compressional data to determine the properties of the subterranean structure.

7. The method of claim 6, wherein receiving the information relating to the dipole compressional data comprises receiving the information relating to dipole compressional data collected in two different dipole flexural modes.

8. The method of claim 1, further comprising:
   using dipole compressional slownesses at higher frequencies to determine azimuths of the maximum horizontal stress direction and the minimum horizontal stress direction.

9. The method of claim 1, further comprising:
   estimating a slowness of fluid in the borehole; and
   determining whether the estimated slowness of the fluid is accurate,
   wherein performing the analyzing is repeated based on an adjusted slowness of the fluid in the borehole in response to determining that the estimated slowness of the fluid is not accurate.

10. The method of claim 9, further comprising adjusting the slowness of the fluid based on processing shear wave data.

11. A system for determining properties of a subterranean formation comprising:
    a controller having a processor configured to:
    receive dipole compressional data collected based on transmitter activation along at least two directions, one of the at least two directions being in a first borehole axial plane containing a maximum horizontal stress direction and another of the at least two directions being in a second borehole axial plane containing a minimum horizontal stress direction, during a logging operation in a borehole; and
    analyze the dipole compressional data corresponding to the maximum horizontal stress direction and the minimum horizontal stress direction to determine the properties of the subterranean structure through which the borehole extends.

12. The system of claim 11, wherein the controller is configured to further:
    receive monopole compressional data based on activation of a monopole acoustic transmitter;
    analyze the monopole compressional data along with the dipole compressional data to determine the properties of the subterranean structure.

13. The system of claim 12, wherein the monopole compressional data is based on transmitter activation of at least one dipole acoustic transmitter.

14. The system of claim 11, wherein the controller is configured to further:
    receive shear data based on activation of a transmitter;
    analyze the shear data along with the dipole compressional data to determine the properties of the subterranean structure.

15. The system of claim 11, further comprising a logging tool to acquire measurements from which the dipole compressional data is based.

16. The system of claim 15, wherein the controller is part of the logging tool.

17. The system of claim 15, wherein the controller is a surface controller.

18. An article comprising at least one non-transitory, computer-readable storage medium storing instructions that upon execution cause a controller including a processor to:
    receive information relating to dipole compressional data collected based on measurements by a logging tool in a borehole; and
    analyze the information relating to the dipole compressional data in multiple dimensions to determine properties of a subterranean structure through which the borehole extends;
    wherein the multiple dimensions include multiple borehole axial planes, and wherein analyzing the information comprises analyzing the information relating to dipole compressional data in two orthogonal axial planes containing a maximum horizontal stress direction and a minimum horizontal stress direction, respectively.

* * * * *